United States Patent
Echtenkamp

(10) Patent No.: US 10,676,281 B2
(45) Date of Patent: Jun. 9, 2020

(54) DRAPER BELT HAVING IMPROVED EDGE DURABILITY

(71) Applicant: ContiTech Transportbandsysteme GmbH, Hannover (DE)

(72) Inventor: Alan C. Echtenkamp, Waverly, NE (US)

(73) Assignee: ContiTech Transportbandsysteme GmbH, Hannover (DE)

( * ) Notice: Subject to any disclaimer, the term of this patent is extended or adjusted under 35 U.S.C. 154(b) by 0 days.

(21) Appl. No.: 15/761,915

(22) PCT Filed: Sep. 30, 2016

(86) PCT No.: PCT/US2016/054564
§ 371 (c)(1),
(2) Date: Mar. 21, 2018

(87) PCT Pub. No.: WO2017/059150
PCT Pub. Date: Apr. 6, 2017

(65) Prior Publication Data
US 2018/0257866 A1    Sep. 13, 2018

Related U.S. Application Data

(60) Provisional application No. 62/234,861, filed on Sep. 30, 2015.

(51) Int. Cl.
*B65G 15/56* (2006.01)
*B65G 15/34* (2006.01)
(Continued)

(52) U.S. Cl.
CPC ............ *B65G 15/56* (2013.01); *A01D 57/20* (2013.01); *A01D 61/002* (2013.01); *A01D 61/02* (2013.01);
(Continued)

(58) Field of Classification Search
CPC ........ B65G 15/56; B65G 15/34; B65G 15/42; A01D 57/20; A01D 61/02; A01D 61/002
(Continued)

(56) References Cited

U.S. PATENT DOCUMENTS 2,305,044 A * 12/1942 Toews .................... B65G 15/42
198/690.2
2,899,242 A * 8/1959 Bombardier ......... B62D 55/244
305/167
(Continued)

FOREIGN PATENT DOCUMENTS

DE    4423431 A1    1/1996
EP    0336385 A1    10/1989
EP    2345321 A2    7/2011

OTHER PUBLICATIONS

Supplementary/ European Search Report dated May 8, 2019 of European application EP 16852648 (european phase of PCT/US2016/054564 on which this application is based).

*Primary Examiner* — Douglas A Hess
(74) *Attorney, Agent, or Firm* — Gregory Adams; David L. Cate

(57) ABSTRACT

A draper belt (8) having a carry layer (14), a pulley cover layer (13), and a reinforcing layer (12) which is situated between the carry layer (14) and the pulley cover layer (13). The carry layer (14) includes a plurality of cleats (7) which are reinforced with reinforcing rods (15). The draper belt (8) has a first edge section (16), a second edge section (17), and a center section (18) located between the first edge section (16) and the second edge section (17). The first edge section (16) and the second edge section (17) of the draper belt (8) each have a modulus that is at least three times greater than the modulus of the center section (18).

24 Claims, 5 Drawing Sheets

(51) Int. Cl.
*B65G 15/42* (2006.01)
*A01D 57/20* (2006.01)
*A01D 61/02* (2006.01)
*A01D 61/00* (2006.01)

(52) U.S. Cl.
CPC .............. *B65G 15/34* (2013.01); *B65G 15/42* (2013.01); *B65G 2201/0202* (2013.01); *B65G 2201/0211* (2013.01)

(58) Field of Classification Search
USPC ............... 198/818, 844.1, 846, 847; 474/264
See application file for complete search history.

(56) References Cited

U.S. PATENT DOCUMENTS

| | | | | |
|---|---|---|---|---|
| 3,373,067 A | * | 3/1968 | Hagstrom | B29C 65/18 156/153 |
| 3,747,995 A | * | 7/1973 | Russ, Sr. | B62D 55/244 305/170 |
| 3,900,627 A | * | 8/1975 | Angioletti | B29D 29/06 198/847 |
| 4,572,359 A | * | 2/1986 | Fujita | B65G 15/32 198/819 |
| 4,899,868 A | * | 2/1990 | Johnson | A01D 61/02 198/520 |
| 5,141,101 A | * | 8/1992 | Vance | B65G 15/34 198/821 |
| 5,244,083 A | | 9/1993 | Arnold | |
| 5,422,165 A | | 6/1995 | Arnold | |
| 5,456,067 A | * | 10/1995 | Marler | B65G 15/42 474/264 |
| 6,137,983 A | * | 10/2000 | Okabayashi | G03G 15/2057 399/329 |
| 6,986,419 B2 | * | 1/2006 | Nishikita | B65G 15/36 198/847 |
| 7,131,532 B2 | * | 11/2006 | Webster | B65G 15/52 198/867.15 |
| 7,543,428 B1 | * | 6/2009 | Puryk | A01D 57/20 430/127 |
| 7,661,256 B2 | * | 2/2010 | Coers | A01D 61/002 198/844.2 |
| 8,910,780 B2 | * | 12/2014 | Pero | B65G 15/34 198/847 |
| 9,771,220 B1 | * | 9/2017 | Honeycutt | B65G 15/40 |
| 10,233,022 B2 | * | 3/2019 | Johnson | A01D 57/20 |
| 2007/0238565 A1 | | 10/2007 | Marler | |
| 2009/0014289 A1 | | 1/2009 | Walter | |

\* cited by examiner

DRAPER BELT HAVING IMPROVED EDGE DURABILITY

RELATED APPLICATION INFORMATION

This patent application claims priority to U.S. Provisional Patent Application No. 62/234,861 filed Sep. 30, 2015, and Patent Cooperation Treaty (PCT) Patent Application No. PCT/US2016/054564, filed Sep. 30, 2016, the disclosures of which are incorporated herein in their entirety, by reference.

FIELD

The field to which the disclosure generally relates is harvesting machines, and more particularly to draper belts having improved durability and extended service life.

BACKGROUND

This section provides background information to facilitate a better understanding of the various aspects of the disclosure. It should be understood that the statements in this section of this document are to be read in this light, and not as admissions of prior art.

Agricultural harvesting machines such as combine harvesters are used to reap, thresh, and winnow grain crops such as wheat, rye, barley, corn, soybeans, oats, flax, sunflower, and canola. More specifically, combine harvesters are used to cut grain crops at the base, separate the grains from the remainder of the plant (the chaff), and sort the grain from the chaff. These machines require special adaptations to accommodate specific crops, navigate through field landscapes, and resist damage from the crops, stone, and the elements; especially moisture and high temperature which can lead to the degradation of the machine's rubber components.

Generally harvesting machines gather crops using a header having crop dividers which define crop gathering gaps as the machine moves through a field. The gathered crops are pushed by a reel into a cutter bar, which runs the length of the header and is equipped with teeth made of metal or plastic to cut crops at their base. Headers may have a rigid or flexible header platform depending upon the operational needs and the crop being harvested. Flexible header platforms or "flex headers" have a cutter bar which is capable of flexing over uneven terrain. Machines using flex headers are most often used to cut soybeans, whereas conventional header platforms have a rigid cutter bar and are most often used to cut cereal crops. Freshly cut crops fall behind the cutter bar and onto a plurality of side by side draper belts which are wrapped around parallel spaced rollers. Draper belts function primarily to consolidate crops and move the crops from the header towards the threshing drum. Crops are fed into the threshing drum by spinning augurs. Inside the threshing drum, the grains are shaken from the plant. Grains fall through sieves into a grain collecting tank, and the plant waste, or chaff, is moved to the back of the machine by conveyor belts for later disposal.

Draper belts are an important component of agricultural harvesters. These belts are often subject to prolonged sun exposure, high temperatures, cold temperatures, rain, moisture, dirt, plant debris, and stone, as well as high levels of friction from the moving machinery and crops. Furthermore, water is known to migrate through the rubber belts carrying corrosive elements and salts which can degrade the belt. Draper belts are typically called upon to operate for long periods of time and over a service life of many years. For these reasons it is necessary that draper belts be specially adapted to maximize durability and service life, and it is desirable for such adaptations to be cost effective.

Some improvements in reducing the susceptibility of draper belts to damage have been made and are reported in the prior art. For instance, U.S. Pat. No. 7,543,428 discloses a seamless draper belt formed from an elongated flat base structure of fabric and rubber. This patent teaches that the belt side edges can be folded over on themselves before curing, or in the alternative separate uncured rubber strips may be placed along the side edges to form a re-enforcing hem to reduce belt edge damage. However, bending of the belt inherently creates a weak point at the center of the fold in the belt edges. Furthermore, separate rubber strips can be vulnerable to being dislodged from the belt edges by damaging events as a result of the rubber composition and belt design, leaving the belt edges and reinforcing fabric within the belt at a greater risk for even more catastrophic belt damage.

Other prior art draper belts have made efforts to reduce their susceptibility to damage, but these belts are inadequate. In an attempt to reduce edge damage, United States Patent Application Publication No. 2007/0238565 A1 shows a draper belt provided with reinforcing plies extending spanwise inwardly from each belt edge. Cleats, oriented spanwise to the belt, are each provided with cleat bases of extended dimension to extend the region of the belt and the cleat which are subjected to stress and strain as the cleat and belt turn over a mounting roller. These reinforcing plies extending from each edge of the belt do not alter the belt edges in a way that could make them any more or less susceptible to damage than the belt as a whole. Furthermore, the belt edges of this draper belt are not strong enough to resist damage from buckling if the belt mis-tracks.

It is common for draper belts of the prior art to fail for one or more reasons. Frequently draper belts mis-track and are damaged by either the front or the back end of the machine header as a result of less than optimal belt edge design and inadequate construction. Accordingly there is a need for a specially adapted draper belt having significantly more durable edges than draper belts of the prior art.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Some embodiments of the disclosure are directed to a specially adapted draper belt which offers improved durability and an extended service life. The draper belts are resistant to ripping and tearing; and unlike belts of the prior art, the draper belts of this disclosure are also resistant to buckling from tracking force. The draper belt edges of the disclosure are made using high modulus material having a modulus at least three times higher than the modulus of the material used in making the center section of the belt. The belt edge sections of these belts are constructed to be much stiffer than the center of the belt. This makes the draper belt according to the disclosure both durable and cost effective.

In some aspects, embodiments are directed to a draper belt having a carry layer, a pulley cover layer, and a reinforcing layer which is situated between the carry layer and the pulley cover layer. The carry layer includes a plurality of cleats, wherein the cleats are reinforced with reinforcing rods. The draper belt has a first edge section and a second edge section which can be comprised of a monofilament fabric or chord fabric to increase edge stiffness.

Some embodiment are draper belts having a carry layer, a pulley cover layer, and a reinforcing layer which is situated between the carry layer and the pulley cover layer, wherein the carry layer includes a plurality of cleats, wherein the cleats are reinforced with reinforcing rods, wherein the draper belt has a first edge section, a second edge, and center edge section located between the first edge section and the second edge section, wherein the first edge section and the second edge section of the draper belt each have a modulus that is at least three times greater than the modulus of the center section.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and wherein.

DETAILED DESCRIPTION

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Figure 1:
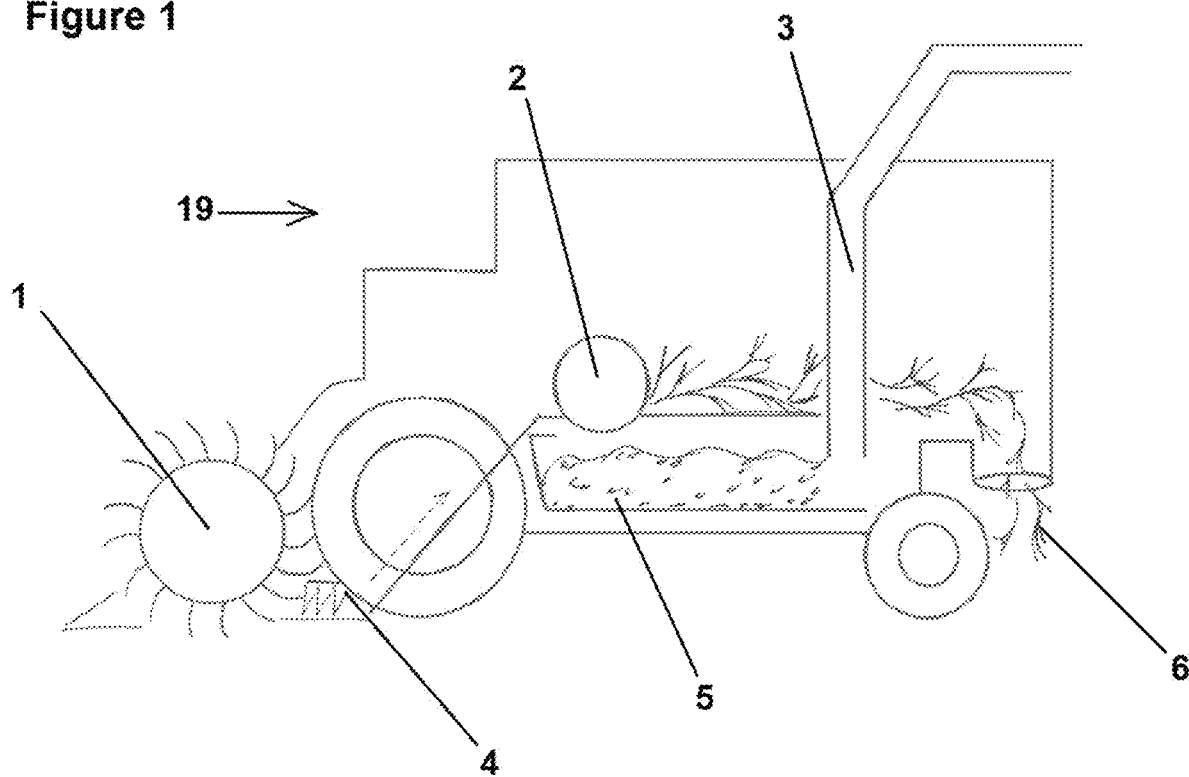
FIG. 1 shows a general cross-sectional view of a conventional agricultural harvesting machine.

FIG. 1 depicts a conventional harvesting machine 19 having a reel 1, a cutter bar 4, a threshing drum 2, and a grain elevator 3. The reel 1 functions to move crops into the cutter bar 4 which cuts the crops at their base using metal or plastic teeth. Cut crops fall upon a plurality of side by side draper belts which consolidate the crops and move them towards the threshing drum 2. The threshing drum 2 beats and breaks the crops to shake the grains 5 from the remainder of the plant, also known as the chaff 6. The grains 5 are collected inside a grain collecting tank. When the grain collecting tank is full, operators dispose of the chaff 6 through the back of the machine 19, and grains 5 are moved from the grain tank at a grain elevator 3.

Figure 2:
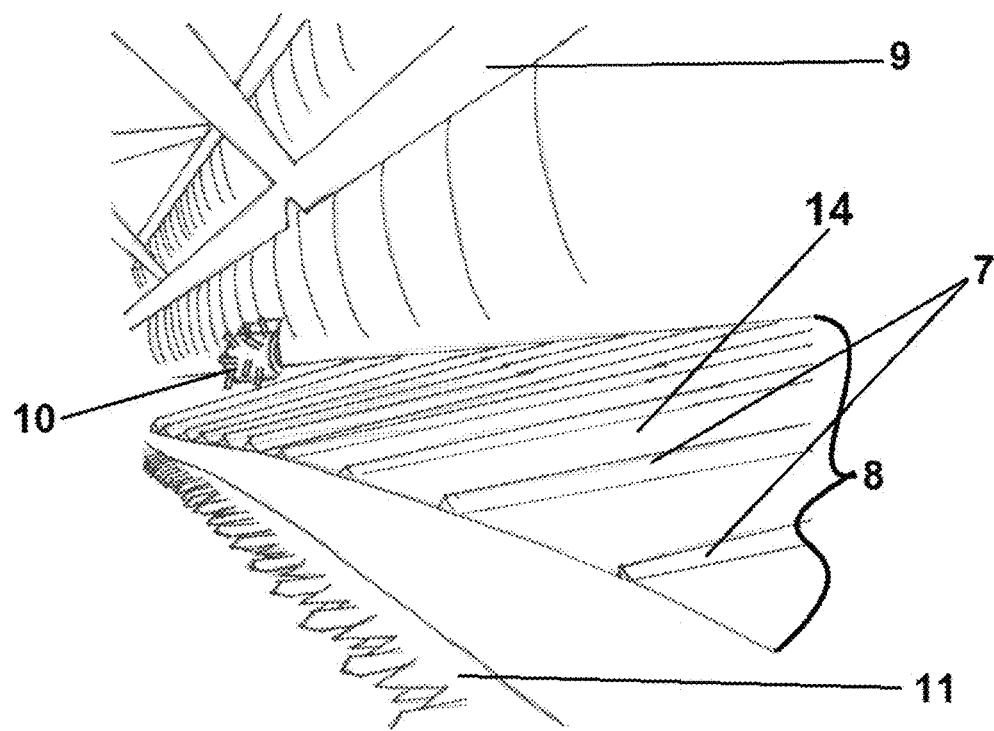
FIG. 2 illustrates a section of a conventional agricultural harvesting machine, in a perspective view.

FIG. 2 shows a section of a conventional harvesting machine having a reel 9, a threshing drum 10, a cutter bar 11, and a draper belt 8 having cleats 7 located on carry layer 14. The carry 14 layer can be chosen from a wide variety of rubbery polymers having a desired combination of physical properties and chemical resistance.

Figure 3:
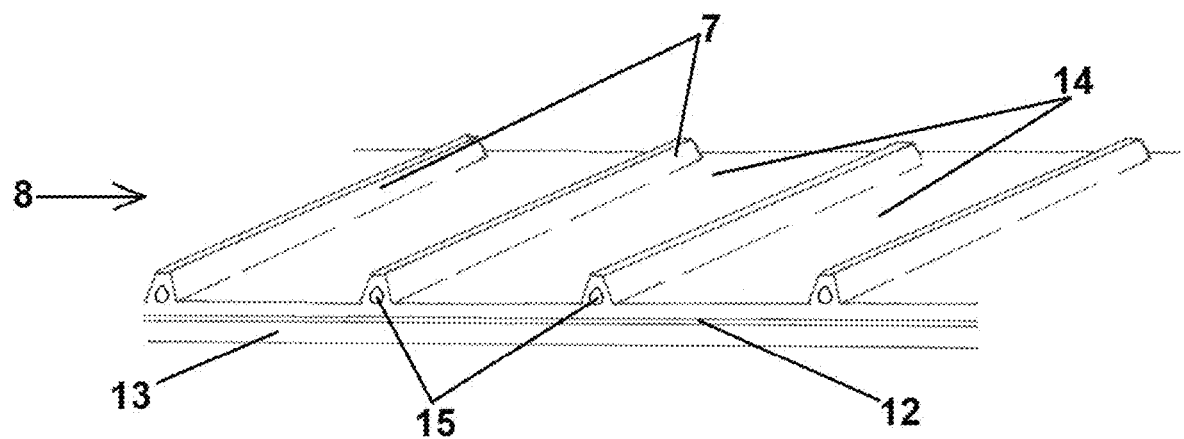
FIG. 3 depicts a draper belt, in a perspective view.
Figure 4:
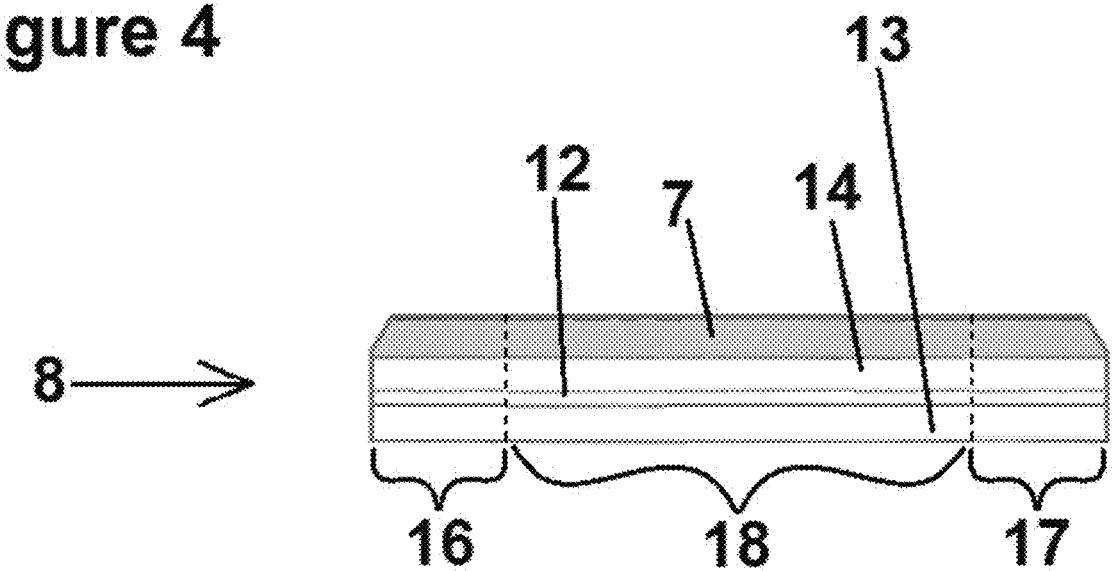
FIG. 4 shows a portion of one embodiment of a draper belt according to the disclosure, in a perspective view; and, FIG. 5 illustrates a portion of an embodiment of a draper belt according to the disclosure, in a perspective view.
Figure 5:
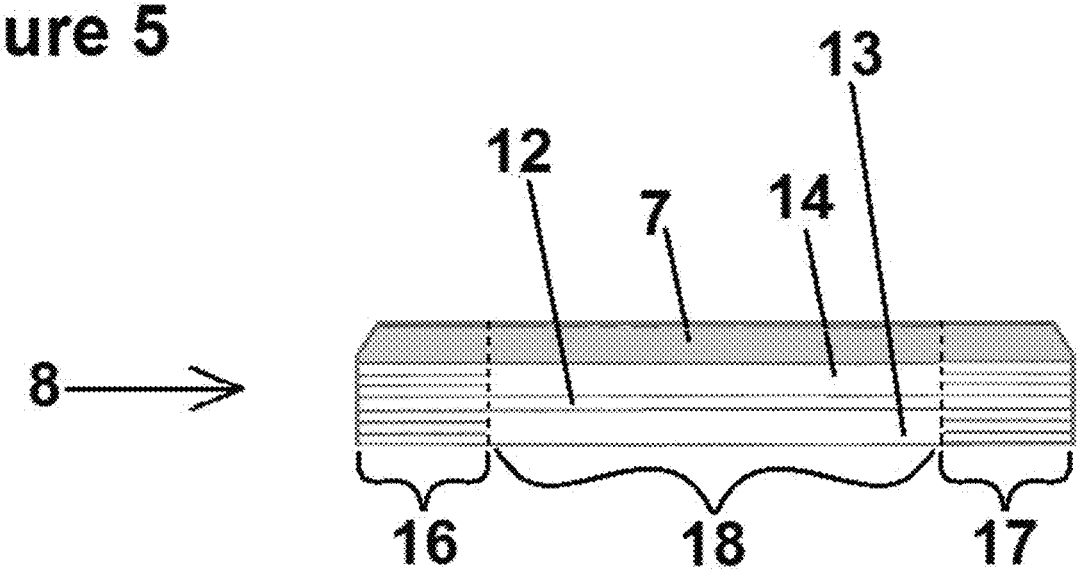

FIGS. 3, 4 and 5 depict a draper belt 8 having a carry layer 14, a pulley cover layer 13, and a reinforcing layer 12 located between the carry layer 14 and the pulley cover layer 13. The carry layer 14 includes a plurality of cleats 7 which are reinforced with reinforcing rods 15.

FIGS. 4 and 5 each show one embodiment of the draper belt according to the disclosure. The draper belt has a first edge section 16 and a second edge section 17 which are each between 3 inches (76.2 mm) and 12 inches (304.8 mm) wide, and a center section 18 located between the first edge section 16 and the section edge section 17. Preferably the draper belt edge sections 16, 17 are each between 4 inches (101.6 mm) and 8 inches (203.2 mm) wide. Draper belts typically have a total width (sum of the width of the first edge section, the center section, and the second edge section) which is within the range of 30 inches (762 mm) to 80 inches (2,032 mm) wide. The draper belts of this disclosure frequently are of a width which is within the range of 50 inches (1.2 meters) to 500 inches (12.7 meters) and typically weigh between 15 pounds (6.80 kg) and 80 pounds (36.29 kg) depending upon the harvester and the function of the belt in conjunction with the harvester header. In many cases the first edge section and the second edge section each have a width which is within the range of 5% to 16% of the total width of the draper belt. Frequently, the first edge section and the second edge section each have a width which is within the range of 8% to 14% of the total width of the draper belt. For instance, the first edge section and the second edge section each have a width which is within the range of 10% to 12% of the total width of the draper belt.

Each draper belt edge section 16, 17 includes a high modulus stiff reinforcing fabric. A wide variety of fabrics can be used to increase the modulus and stiffness of belt edge sections 16, 17. In one scenario, the reinforcing fabric can be comprised of a conventional tire cord. Tire cord is known to be very dimensionally stable and it is especially effective over a wide temperature range in comparison to other cords. The tire cord can be comprised of polyethylene terephthalate (commonly known as PET, or PETE) which typically has an intrinsic viscosity which is within the range of 0.60 dl/g and 1.0 dl/g. Tire cord can also be made using polyethylene naphthalate (commonly known as PEN). The fabric utilized in the belt of this disclosure can include polyester or nylon fibers or a combination of both. The reinforcing fabric is typically treated in a resorcinol formaldehyde latex (RFL) dip to enhance adhesion between the rubber in the belt and the fabric. The latex used in the RFL dip is typically a vinylpyridine latex. The fabric used in the draper belt can include optionally be an aramid fabric.

In one embodiment of this disclosure, belt edge sections 16, 17 have a modulus that is at least three times greater than the modulus of the center section. In one embodiment of this disclosure, this is achieved by including a reinforcing fabric in the edge sections of the belt having a modulus which is much higher than the modulus of the reinforcing fabric used in the center section of the draper belt. For instance, the fabric used in the edge sections can be made with cords or filaments of a higher denier or with a material which inherently has a higher modulus or a combination of both. In one embodiment of this disclosure the fabric in the center section of the draper belt can be comprised of PET with the edge sections of the belt including fabric with is comprised of PEN or an aramid. In this embodiment of the disclosure the fabric reinforcement in the edge sections of the belt is of approximately the same as the thickness of the fabric reinforcement in the center section of the belt as depicted in FIG. 4.

In FIG. 5, the high modulus of the edge sections 16, 17 is achieved by using at least three times more fabric reinforcement in the first edge section and the second edge section of the belt than is used in the fabric reinforcement layer 12 found in the center section 18 of the draper belt 8. As depicted in FIG. 5, the additional fabric reinforcements extend under the carry layer 14 and over the pulley cover layer 13 of the conveyor belt 8. In one embodiment of this disclosure, the draper belt edge sections 16, 17 have a modulus that is at least four times greater than the modulus of the center section. In a still another embodiment, the draper belt edge sections 16, 17 have a modulus that is at least five times greater than the modulus of the center section. As shown in FIG. 5 the edge sections 16, 17 have a narrowed pulley cover layer 13 and a narrowed carry layer 14 to accommodate the larger reinforcing layer 12. In other words, the pulley cover layer and the carry layer are thinned in the edge sections of the belt than they are in the center section of the belt.

As a result of the materials and design of this disclosure, the draper belt 8 of the disclosure is resistant to tearing, it effectively prevents debris from proceeding through the sides of the belt, and it prevents the belt from buckling in the event of misalignment or other belt damage known to cause buckling in conventional belts.

LIST OF REFERENCE SIGNS (PART OF THE DESCRIPTION)

1 Reel
2 Threshing Drum
3 Grain Elevator
4 Cutter Bar
5 Grains
6 Chaff
7 Cleats
8 Draper Belt
9 Reel
10 Threshing Drum
11 Cutter Bar
12 Reinforcing Layer
13 Pulley Cover Layer
14 Carry Layer
15 Reinforcing Rods
16, 17 Draper Belt Edge Sections
18 Draper Belt Center Section The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A draper belt comprising a carry layer, a pulley cover layer, and a reinforcing layer which is situated between the carry layer and the pulley cover layer, wherein the carry layer includes a plurality of cleats, wherein the cleats are reinforced with reinforcing rods, wherein the draper belt has a first edge section, a second edge section, and center edge section located between the first edge section and the second edge section, and wherein the first edge section and the second edge section of the draper belt each have a belt modulus that is at least three times greater than the belt modulus of the center section and wherein the first edge section and the second edge section comprise an edge fabric reinforcement having a higher belt modulus than a center fabric reinforcement of the center section;

wherein the pulley cover layer is narrower in the first edge section.

2. The draper belt as claimed in claim 1, wherein the edge fabric reinforcement is comprised of one of polyester tire cord, cord fabric, or monofilament fabric.

3. The draper belt as claimed in claim 1, wherein the first edge section and the second edge section of the draper belt are each between 3 inches (76.2 mm) and 12 inches (304.8 mm) wide.

4. The draper belt as claimed in claim 3, wherein the first edge section and the second edge section of the draper belt are each between 4 inches (101.6 mm) and 8 inches (203.2 mm) wide.

5. The draper belt as claimed in claim 1, wherein the edge fabric reinforcement is comprised of polyethylene naphthalate or aramid fabric, and wherein the center fabric reinforcement is comprised of polyethylene terephthalate.

6. The draper belt as claimed in claim 1, wherein the draper belt has a total width which is within the range of 30 inches (0.76 meters) to 80 inches (2.0 meters).

7. The draper belt as claimed in claim 1, wherein the draper belt has a total width which is within the range of 50 inches (1.2 meters) to 500 inches (12.7 meters).

8. The draper belt as claimed in claim 1, wherein the edge fabric reinforcement is a triple layer of fabric reinforcement and the triple layer of fabric reinforcement is at least three times the thickness of the center fabric reinforcement used in the center section.

9. The draper belt as claimed in claim 1, wherein the edge fabric reinforcement is a quadruple layer of fabric reinforcement.

10. The draper belt as claimed in claim 1, wherein the first edge section and the second edge section each have a width which is within the range of 5% to 16% of the total width of the draper belt.

11. The draper belt as claimed in claim 1, wherein the first edge section and the second edge section each have a width which is within the range of 8% to 14% of the total width of the draper belt.

12. The draper belt as claimed in claim 11, wherein the first edge section and the second edge section each have a width which is within the range of 10% to 12% of the total width of the draper belt.

13. A draper belt comprising a carry layer, a pulley cover layer, and a reinforcing layer which is situated between the carry layer and the pulley cover layer, wherein the carry layer includes a plurality of cleats, wherein the cleats are reinforced with reinforcing rods, wherein the draper belt has a first edge section, a second edge section, and center edge section located between the first edge section and the second edge section, wherein the first edge section and the second edge section each comprise a fabric reinforcement which is a quadruple layer of fabric reinforcement used in the center section and the first edge section and the second edge section have a higher belt modulus than the center edge section based on the quadruple layer of fabric reinforcement; and wherein the pulley cover layer is narrower in the first edge section than in the center section.

14. The draper belt as claimed in claim 13, wherein the first edge section and the second edge section of the draper belt each have a modulus that is at least three times greater than the modulus of the center section.

15. The draper belt as claimed in claim 13, wherein the first edge section and the second edge section of the draper belt are each between 3 inches (76.2 mm) and 12 inches (304.8 mm) wide.

16. A draper belt comprising:
a carry layer that includes a plurality of cleats reinforced with reinforcing rods, a pully cover layer and a reinforcing layer situated between the carry layer and the pulley cover layer;
a center section of the draper belt having a center belt modulus based on a center fabric reinforcement; and
an edge section of the draper belt having an edge belt modulus based on an edge fabric reinforcement and wherein the edge belt modulus is greater than the center belt modulus and wherein the edge fabric reinforcement is at least partially located in the pulley cover layer and the pulley cover layer is narrower in the edge section than in the center section.

17. The draper belt of claim 16, wherein the edge fabric reinforcement is thicker than the center fabric reinforcement.

18. The draper belt of claim 16, wherein the edge section includes an edge pulley cover layer and the center section includes a center pulley cover layer and the edge pully cover layer is thinner than the center pulley cover layer.

19. The draper belt of claim 16, wherein the edge fabric reinforcement has a higher denier than the center fabric reinforcement.

20. The draper belt of claim 16, wherein the edge belt modulus is at least 5 times greater than the center belt modulus.

21. A method of fabricating a draper belt having a first edge section, a center section and a second edge section, the method comprising:
forming a cover layer within the first edge section, the center section and the second edge section;
forming a carry layer within the first edge section, the center section and the second edge section;
forming a center reinforcement layer within the center section and having a center reinforcement fabric;
forming an edge reinforcement layer within the first edge section and having an edge reinforcement fabric; and
wherein the first edge section has a higher modulus than the center section and the thickness of the edge reinforcement fabric is greater than the thickness of the center reinforcement fabric.

22. The method of claim 21, wherein the thickness of the edge reinforcement fabric is at least three times the thickness of the center reinforcement fabric.

23. The method of claim 21, wherein forming the edge reinforcement layer comprises forming at least a portion of the edge reinforcement layer in the cover layer and a remaining portion of the edge reinforcement layer in the carry layer.

24. The method of claim 21, wherein forming the carry layer comprises forming a narrower layer in the first edge section than in the center section.

\* \* \* \* \*